R. H. Emerson,
Windlass.
N° 64,005. Patented Apr. 23, 1867.
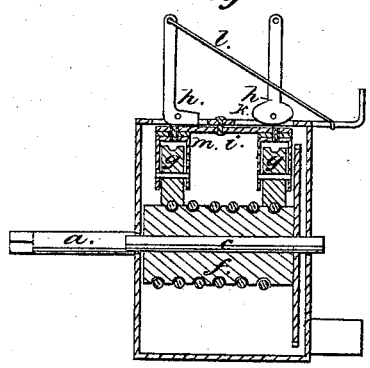
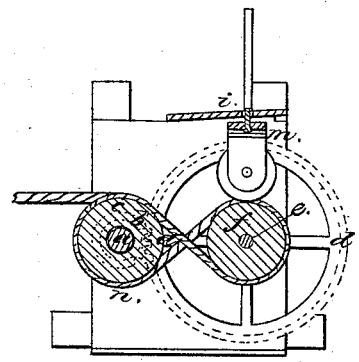
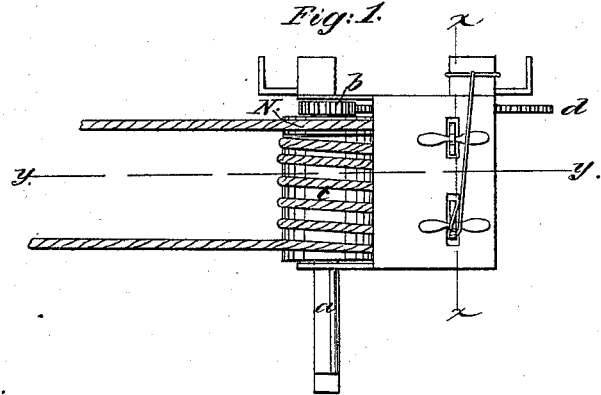
Witnesses:
J. Warren Brown
A. J. Heyhurn
Inventor:
Richard H. Emerson

United States Patent Office.

RICHARD H. EMERSON, OF FOND DU LAC, WISCONSIN.

Letters Patent No. 64,005, dated April 23, 1867.

IMPROVEMENT IN WINDLASSES.

The Schedule referred to in these Letters Patent and making part of the same.

TO ALL WHOM IT MAY CONCERN:

Be it known that I, RICHARD H. EMERSON, of Fond du Lac, in the State of Wisconsin, have invented a new and useful Improvement in Windlasses. The object of my invention is to afford a windlass possessing great lifting power, and, by the arrangement of the pulleys, to enable the operator to stop the weight when desired, and also to secure an uninterrupted discharge of the slack; and I do hereby declare that the following is a full, clear, and exact description of the construction and operation of the same, reference being had to the annexed drawings, making a part of this specification, in which—

Figure 1 is a perspective view.
Figure 2, an end section; and
Figure 3, a cross-section.

$a$ represents the power shaft, having firmly fixed upon it the small cog-wheel $b$. $c$, a drum-pulley upon the shaft $a$, working freely thereon. $d$, a large cog-wheel fast on the shaft $e$. $f$, a drum-pulley, secured firmly upon the shaft $e$, and made smaller than the drum-pulley $c$, for the purpose of obtaining a larger friction surface upon its face. $g\ g'$ are grooved pulleys, swung, as represented in the drawings, upon the spring-bar. $h\ h'$ are levers, held by proper fastenings in the upper cross-brace of the machine, the former being eccentric in its action, and the latter operating as a cant. $i$ is a spring-bar, upon which are swung the pulleys $g\ g'$. The bar is held securely by the bolt or rivet $k$ extending through it and the upper cross-brace. By the pressure of the eccentric-lever $h$ upon the rope the weight may be stayed at any position desired; and by the pressure of the cant-lever $h'$ the slack may be regulated to suit the operator. This lever may be retained in the desired position by the strap or rope $l$, made fast to the leg of the machine. At $m$ is an elastic inserted, intended to obviate any difficulty arising from any unevenness in the rope. $n$ is a pulley upon the shaft $a$, independent of the drum-pulley $c$, and working freely upon the shaft. Its object is to convey the rope from the object to the pulley $f$; and the reason why it is made independent of the pulley $c$ is that the drum-pulley $f$, being made smaller than the drum-pulley $c$, it consequently moves with a different velocity; but by means of the pulley $n$ an equality of motion is obtained, and the machine saved from any strain which might occur if otherwise arranged. The frame of the machine is constructed as shown in the drawings, and the bearings of the shafts are in the side pieces of the frame. The machine may be set either upright or lateral, according to the power applied.

What I claim as my improvement, and desire to secure by Letters Patent, is—

A windlass, having shaft $a$, wheel $b$, drum-pulley $c$, wheel $d$, drum-pulley $f$, pulleys $g\ g'$, elastic $m$, spring-bar $i$, levers $h\ h'$, arranged, combined, constructed, and operating substantially as described.

RICHARD H. EMERSON.

Witnesses:
A. G. HEYBRUNN,
FRANCIS A. GIBBONS.